United States Patent Office 3,510,556
Patented May 5, 1970

3,510,556
17α-ETHERS OF 16-METHYLENE-19-NOR-PROGESTERONES
Rolf Erb, Seelbach, uber Lahr, Klaus Irmscher, Klaus Brückner, Hans-Günther Kraft, Darmstadt-Eberstadt, and Hartmut Kieser, Darmstadt, Germany, assignors to E. Merck A.G., Darmstadt, Germany
No Drawing. Filed Nov. 23, 1966, Ser. No. 596,439
Claims priority, application Germany, Nov. 26, 1965,
M 67,421
Int. Cl. C07c *169/32, 169/34*
U.S. Cl. 424—240          10 Claims

ABSTRACT OF THE DISCLOSURE

Steroids having ovulation-inhibiting activity and little or no anti-androgenic effect are compounds of the formula:

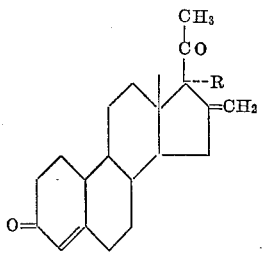

wherein R represents an etherified hydroxy group, preferably alkoxy of 1–8, particularly 1–4 carbon atoms.

---

This invention relates to novel steroids, and in particular to novel steroids having a combination of properties which make them especially valuable as contraceptives.

Another object of this invention is to provide pharmaceutical compositions, and methods of administration based on the novel steroids of this invention.

Upon further study of the specification and claims, other objects and advantages of the present invention will become apparent.

For the attainment of the above objects, there are provided novel steroids of the Formula I:

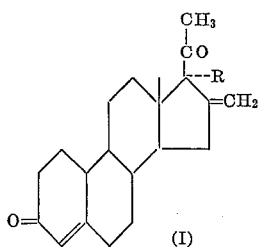

wherein R represents an etherified hydroxy group, preferably alkoxy of 1–8, particularly 1–4 carbon atoms.

These compounds show a particularly valuable differentiation of the anti-estrogenic and progestational activities. Due to this differentiation, they are particularly suitable for prolonged or permanent administration as a contraceptive. Progestational agents possessing a strong anti-estrogenic effect do not produce as much breakthrough bleedings as progestational agents which do not possess this strong anti-estrogenic activity when applied for this purpose; the substances according to this invention exhibit these undesirable bleedings only to a slight extent while the effect on the cervical mucus is maintained.

It is also unexpected and beneficial that these compounds possess an extremely weak anti-androgenic effect or no anti-androgenic effect at all. For when employed as a contraceptive, the danger of a possible feminizing influence on the male fetus is thereby practically excluded if the substances are inadvertently applied during an unrecognized pregnancy.

Furthermore, the compounds according to the invention are capable of maintaining pregnancy. In comparison to substances applied for the same purpose they are advantageous because a feminizing influence on the male fetus is practically excluded as stated above.

Preparation of compounds of the invention

To prepare the 16-methylene-19-nor-progesterone derivatives of the above Formula I, a 5(6)-dehydro-10-carboxy-16-methylene-19-nor-pregnane derivative of the Formula IIa:

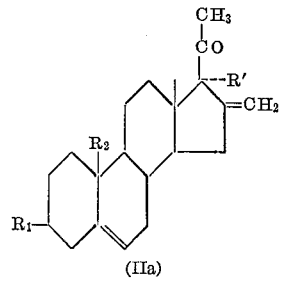

wherein $R_1$ represents a free or esterified hydroxy group;
$R_2$ represents a free or esterified carboxy group; and
$R'$ represents a free, esterified, or etherified hydroxy group, is treated in successive steps of any desired sequence, or simultaneously, with a mild oxidizing agent and a decarboxylation agent, with the provision that any residues $R_1$ or $R_2$ representing an esterified hydroxy or an esterified carboxy group are saponified, partially or completely, before the oxidation or decarboxylation step.

An alternative method of production comprises the treatment of a 4(5)- or 5(6)-dehydro-10-formyl-16-methylene-19-nor-pregnane derivative of the Formula IIb:

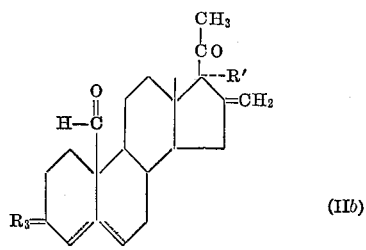

wherein $R_3$ represents

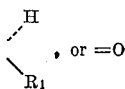

$R'$ and $R_1$ have the above-indicated meanings, and a C═C double bond is present in the formula, in the 4,5- or in the 5,6-position, corresponding to the dashed lines, with acidic or alkaline agents.

A further method comprises the treatment of a 4(5)- or 5(6)-dehydro-10-cyano-16-methylene-19-nor-pregnane derivative of the Formula IIc:

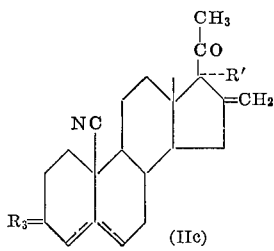

wherein

R' and $R_3$ have the above-indicated meanings, and a C=C double bond is present in the 4,5- or in the 5,6-position, corresponding to the dashed lines in the formula, after a temporary ketalization of the CO-groups, with an alkali metal in the presence of an alcohol, or with an alkali amide, and is then subsequently hydrolyzed.

If desired, the thus-obtained compounds are treated with a gentle oxidation agent, and/or an agent customarily used for the saponification of esterified tertiary hydroxy groups, and/or an agent customarily used for the etherification of tertiary hydroxy groups.

Preferably, the radical R stands for lower alkoxy of 1–4 carbon atoms, in particular for methoxy and ethoxy.

According to a first embodiment of the process of this invention, the 16-methylene-19-nor-progesterone derivatives of Formula I can be produced by starting with a 5(6)-dehydro-16-methylene steroid of the above-indicated Formula IIa. The residue $R_1$ in the starting product IIa can represent a free or esterified hydroxy group, preferably a free hydroxy group or a hydroxy group esterified with lower acyl, particularly acetyl; and the residue $R_2$ can represent a free carboxy group, or a carboxy group esterified with an alcohol, particularly a lower alkanol, such as methanol or ethanol.

The 3β-hydroxy group of the starting compounds of Formula IIa can be converted into a 3-keto group, in a conventional manner by treatment with a gentle oxidation agent; however, if an esterified OH-group is in the 3-position, it must be saponified before the oxidation step. This process step can be conducted by the usual means for conducting an oxidation of 3-hydroxy to 3-keto groups. Preferred oxidation agents are solutions of chromic acid/sulfuric acid in inert solvents, for example, in acetone or pyridine at low temperatures, for example, about 0 to about 40° C., or mixtures of lead tetraacetate with pyridine and any other suitable solvent, such as benzene, hexane, or chloroform. The oxidation of the 3-hydroxy group can also be conducted under the conditions of an Oppenauer dehydrogenation. For this purpose, there are used, for example, solutions of aluminum tert.-butylate or isopropylate, and acetone or cyclohexanone in an inert solvent, such as benzene or toluene. The reaction is advantageously conducted under reflux.

The oxidation can also be conducted microbiologically, for example, with the use of microorganisms of the genus Flavobacterium dehydrogenans. The nutrient solution for Flavobacterium dehydrogenans is, for example, a solution of a 1% yeast extract in water, buffered to a pH of 6.8. After about 10 to 20 hours of growth at about 28° C., the starting steroid is added to the culture of bacteria. The cultivation is continued under aeration for about 6 to 10 hours. The progress of the reaction can be controlled, if desired, by measuring the UV spectrum, or by means of thin layer chromatography.

The residue $R_2$ of the starting product of Formula IIa is split off by conventional decarboxylation methods. Any esterified carboxy group present in the 19-position must be saponified first, in a conventional manner, for example, by treatment with acidic or alkaline agents, preferably by weakly alkaline agents, such as an aqueous-alcoholic solution of sodium bicarbonate.

The decarboxylation can also be conducted with inorganic or organic acids, particularly mineral acids, such as hydrochloric acid or sulfuric acid, in a suitable solvent, preferably in a lower alcohol, such as methanol, at an elevated temperature, for example, at the boiling temperature of the alcohol added. Furthermore, the carboxy group can be split off preferably at about 70–130° C., by the effect of alkalis, for example, tertiary bases, such as trialkylamines, pyridine, quinoline, and isoquinoline; this is followed by treatment with inorganic bases, such as solution of caustic soda, sodium acetate, sodium bicarbonate, in a lower alcohol at room temperature.

In the acid decarboxylation of 10-carboxy-16-methylene-19-nor steroids containing a 3-keto group and a 5(6)-double bond, the 5(6)-double bond is transposed to the 4(5)-position. When, on the other hand, tertiary bases are employed for decarboxylation, there are first obtained mixtures of 5(6)-dehydro- and 5(10)-dehydro compounds which are isomerized into the desired 4(5)-dehydro-3-keto-steroids by treatment with inorganic bases, for example, with dilute potassium hydroxide solution in methanol at room temperature.

In some cases, it is advantageous to conduct the acid cleavage of the carboxy group in the presence of an organic hydrazide, particularly in the presence of a Girard reactant, such as Girard Reactant T. The use of a Girard reactant is particularly advantageous when undesired by-products are present which do not contain any keto groups, said by-products being derived from the oxidation step, for example. The addition of a Girard reactant makes it possible to convert the keto compounds into the water-soluble adducts thereof; the latter can then be separated from the water-insoluble undesired by-products, for example, by ether extraction. The Girard derivatives of the 3-keto steroids can thereafter be readily and conventionally split, for example, by the effect of acids at room temperature, so as to obtain the basic keto compounds. In this connection, a decarboxylation likewise occurs so that there are obtained in this manner, from steroids having a free 10-carboxy group, the corresponding decarboxylated compounds of Formula I.

Furthermore, it is possible to conduct the decarboxylation in a purely thermal manner, for example, by heating the 10-carboxy-19-nor steroids to temperatures between 50 and 250° C., if desired in an inert diluent, such as paraffin.

With respect to the starting products IIa, the oxidation of the 3-hydroxy group, the decarboxylation, and, if desired, the etherification in the 17-position can be conducted successively in any desired sequence, or even simultaneously. In a preferred embodiment of the present invention, compounds of the above-indicated Formula IIa wherein $R_1$ represents OH and $R_2$ represents COOH, are converted by oxidation and subsequent decarboxylation into compounds of Formula I. The intermediate in this mode of operation is a 3-keto-5(6)-dehydro-10-carboxy-17-R-19-nor steroid [R having the significance indicated in Formula I].

The compounds of Formula I are also readily obtained by oxidizing and subsequently decarboxylating a 5(6)-dehydro-16-methylene steroid of Formula IIa wherein $R_1$=OH and $R_2$=COOH. When using a starting product IIa containing in the 3- and 10-position an esterified OH residue or an esterified carboxy group, respectively, it is possible, if desired, to liberate the 3-hydroxy group, first partially, under gentle conditions, for example, by treatment with hydrochloric acid or acetyl chloride in methanol at room temperature, then to oxidize this group to the 3-keto group, and subsequently to liberate the 10-carboxy group partially, for example, by boiling with aqueous-methanolic sodium carbonate, and finally to decarboxylate this 10-carboxy group.

In a further embodiment of the process of the invention, the 4(5)- or 5(6)-dehydro-10-formyl-16-methylene-19-nor-pregnane derivatives of the above Formula IIb are converted into the desired final products of Formula I by treatment with acidic or alkaline agents, with the 10-formyl group being split off. For example, the formyl group can be split off from the starting compounds IIb by strong acids, particularly mineral acids, such as hydrochloric acid or sulfuric acid, at an elevated temperature, for example, by several hours of boiling with acids in an inert solvent. Preferred inert solvents, in this connection, are, for example, ethers, such as diethyl ether, dioxane, or hydrocarbons, such as benzene, or chlorinated hydrocarbons, such as chloroform, and alcohols, such as ethanol, the latter type of solvent being particularly effective. If an esterified OH-group is present in the 3-position of the starting product, it is saponified during the splitting-off step by acidic or alkaline agents.

In a still further method of producing the compounds of this invention, they are prepared by conventionally splitting off the nitrile group from a 4(5)- or 5(6)-dehydro-10-cyano-16-methylene-19-nor-pregnane derivative of the above-indicated Formula IIc, but after a temporary ketalization of the keto group. The nitrile group is split off by the effect of an alkali metal in an alcohol or by treatment with an alkali amide. The starting compounds IIc are, for this purpose, preferably dissolved in an anhydrous alcohol, for example, methanol or ethanol, if desired, together with an inert solvent, such as toluene or dioxane, and are made to react with the suspension of an alkali metal or an alkali amide, the latter being optionally formed in situ. The reaction is terminated at an elevated temperature, for example, by boiling under reflux. In particular, suspensions of lithium, sodium, potassium, or sodium amide are employed. The thus-obtained adducts are conventionally hydrolyzed, for example, by the addition of alcohol and water to the reaction mixture, and the resultant 19-nor compounds of Formula I are isolated, for example, by extraction or by precipitation in water, with or without applied cooling. Any esterified hydroxy groups present in the starting compounds IIc in the 3- and/or 17-position are also saponified in this embodiment.

The temporary ketalization of the keto groups is conducted in a conventional manner. For example, the starting products IIc can be converted into the 20-ketals, or 3,20-diketals, e.g., into the corresponding ethylene ketals, by 3 to 30 hours of boiling with p-toluenesulfonic acid and a glycol, such as ethylene glycol in benzene. The reaction mixture is azeotropically distilled to remove benzene/water, whereas the hydrolysis to the 20-ketone or the 3,20-diketone can be conducted, for example, by treatment with dilute inorganic acids, such as sulfuric acid, in a suitable solvent, such as methanol at room temperature or under reflux.

If an OH-group is present in the 3-position of a compound obtained by splitting off the formyl or cyano group from the starting products IIb or IIc, this compound is converted into the corresponding 3-keto compound by means of agents which are usually employed for the oxidation of 3-hydroxy to 3-keto steroids, such agents having already been described in detail in connection with the first discussed process for producing the compounds of Formula I.

If the compounds obtained by any of the preceding methods contain any ester groups in the 17α-position, these ester groups must be saponified, preferably by means of alcoholic sodium or potassium hydroxide. The free 17α-hydroxy compounds obtained in this way or by any other of the methods described above must be etherified in the 17α-position. This etherification can be achieved by any of the conventional methods. A preferred method embraces the use of an alkyl halogenide in the presence of freshly precipitated silver oxide or silver hydroxide, or silver carbonate.

PREPARATION OF STARTING COMPOUNDS

The starting compounds for the process of the invention can be produced as follows: A 3β-acyloxy [preferably acetoxy]-16-methylene-17α-hydroxy-5(6)-pregnene-20-one is converted, with a hypohalous acid, for example with HOBr, into 3β-acyloxy [preferably acetoxy]-5α-halogeno [preferably -bromo]-6β-hydroxy-16β-halogenomethyl [preferably -bromomethyl] - 16,17α - oxido-pregnane-20-one, which compound is converted, by nitrosation, into the corresponding 6β-nitrosyloxy compound. The latter compound, in turn, is reacted by irradiation (for example by the light of a high pressure mercury lamp), to the 3β-acyloxy [preferably acetoxy]-5α-halogeno [preferably -bromo]-6β-hydroxy - 16β - halogenomethyl [preferably -bromomethyl] - 16,17α - oxido-19-oximino-pregnane-20-one. From the oximes it is possible to produce, by deoximation, subsequent oxidation, and following dehalogenation, in a conventional manner, via the 19,6-hemiacetal and the 19,6-lactone of 3β-acyloxy [preferably acetoxy-5α-hologeno [preferably -bromo]-6β-hydroxy-16β-halogenomethyl [preferably -bromomethyl]-16,17α-oxido-pregnane-20-one-19-acid, the starting products of the above Formula IIa wherein $R_2$ is a free carboxy group, and R is a free hydroxy group. By esterification or etherification in the conventional manner, there are obtained therefrom the corresponding compounds of Formula IIa, wherein $R_2$ represents an esterified carboxy group, or R represents an esterified or etherified hydroxy group. By partial or complete saponification in accordance with conventional methods, starting products IIa are obtained wherein $R_1$ is a free hydroxy group.

Starting products IIa wherein $R_1$ is OH and $R_2$ is COOH can also be obtained from a corresponding 3β-hydroxy-10-cyano-19-nor- or a 3β-acyloxy-10-cyano-19-nor compound by alkaline saponification in an autoclave.

The starting compounds of the above Formulae IIb and IIc can be obtained from the corresponding 16-bromomethyl-16,17α-oxido-19-oximino compounds or the 19-nitroisomers thereof in dimeric form, by hydrolysis or dehydration and subsequent treatment with zinc dust in glacial acetic acid.

Details of the individual steps for the preparation of the starting materials are found in the literature.

PHARMACEUTICAL COMPOSITIONS

The novel compounds can be employed in mixture with conventional pharmaceutical excipients, if desired in combination with other active agents, for example, other steroids, particularly in preparations for oral application. Carrier substances can be, for example, vegetable oils, polyethylene glycols, gelatin, lactose, amylose, magnesium stearate, talc, stearin, cholesterol, etc. The substances can be administered in the form of tablets, pills, dragees, emulsions, or solutions. Of course, it is also possible to add thereto the conventional auxiliary agents, such as preservatives, stabilizers, or wetting agents.

Advantageously, the compounds are administered to mammals in unit dosages of about 0.3 to 200 mg. In this connection, a pill or tablet is a useful form wherein a binder of talc or a carbohydrate is employed. Alternatively, a teaspoon or tablespoon can be employed as a dosage unit if a liquid form is desired, and in such cases, as well as in other forms of oral administration, a sweetened vehicle can be employed. It is preferred that the amount of carrier in a dosage unit should be about 0.01 to 5 g. An effective dosage of the novel steroids of this invention can be administered by any conventional method, such as topical, peroral, and parenteral.

The progestational activity of the new steroids can be shown in the Clauberg assay on young female rabbits (see, for instance, McPhail, Journal of Physiology, vol. 83, page 145 [1935]).

The anti-estrogenic activity can be determined by the method of Dorfman, Endocrinology, vol. 68, page 17 (1961).

The anti-androgenic activity can be determined by administering the test compounds together with testosterone propionate to castrated male rats and determining the effect of the dosages given on the weight of seminal vesicles and prostate.

The new compounds are useful to treat all types of pathological conditions usually treated with 17α-acetoxy-progesterone or its derivatives. For instance, the substances are suitable as means for combating threatening abortion, for restoring the uterus mucous membranes, for inhibiting ovulation, or in functional uterine bleeding.

Furthermore, they may be combined with estrogenic substances, such as 17α-ethynyl estradiol or the 3-ethers or esters thereof. Such combinations are especially suitable for the treatment of amenorrhea and for all indications in corpus luteum therapy. In addition, such combinations may be used in all cases where an antiovulatoric effect is desired. Preferred 3-ethers and 3-esters are the 3-methyl ether, the 3-cyclopentyl ether, and the 3-acetate.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE I 300 mg. of 3β,17α-dihydroxy-16-methylene-5-pregnene-20-one-19-oic acid are dissolved in 100 ml. of absolute acetone. 0.56 ml. of a chromic acid solution (produced by mixing 27 g. chromium trioxide with 23 ml. sulfuric acid and filling up with water to a volume of 100 ml.) is added dropwise under a nitrogen atmosphere at 0–4° C. Thereafter, the reaction mixture is stirred for ½ hour at 2–4° C., the acetone is removed, the residue is mixed with ice water, and the organic phase is extracted with chloroform. The residue of the chloroform extract (300 mg.) is dissolved in 25 ml. methanol and boiled for 1½ hours with 8.3 ml. water and 418 mg. Girard reagent T. Then, the mixture is poured into ice water containing sodium carbonate; the non-ketonic components are extracted with ether. Thereupon, the aqueous solution is made acidic with hydrochloric acid, allowed to stand overnight, and extracted with ether. After drying and removing the ether by evaporation, there remain 110 mg. of a resin. By chromatography, there are obtained from this resin 60 mg. of 16 - methylene - 17α-hydroxy-19-nor-progesterone, M.P. 234–235° C.

65.6 mg. 16 - methylene-17α-hydroxy-19-nor-progesterone are dissolved in 1 ml. dimethyl formamide and mixed with 0.2 g. freshly precipitated silver oxide, 0.2 g. sodium sulfate, and 2 ml. ethyl iodide. Then, the mixture is stirred in darkness for 48 hours at 20° C. After filtration, the solvent is substantially removed under reduced pressure, and the residue is taken up in ether. After conducting the usual working-up operation, the thus-obtained 16-methylene - 17α - ethoxy-19-nor-progesterone is recrystallized from acetone, M.P.146–147° C.

Production of the starting material 200 g. 3β - hydroxy-16β-methyl-16α,17α-oxido-5-pregnene-20-one are stirred overnight at room temperature with 750 ml. pyridine and 750 ml. acetic anhydride. The reaction mixture is then stirred into water; the precipitate is filtered off, washed with water, and dried. There are obtained 220 g. of 3β-acetoxy-16β-methyl-16α,17α-oxido-5-pregnene-20-one, M.P. 180–182° C.

193 g. of the 3β-acetate are dissolved in 5 l. of ethyl acetate. Thereafter, hydrogen chloride is introduced at 30–40° C., until the reaction mixture attains a weight increase of about 400 g. Now, the reaction mixture is boiled for 2 hours, concentrated to about 1 liter, cooled, and the precipitate is vacuum-filtered. There are obtained 176 g. 3β-acetoxy-16-methylene-17α-hydroxy-5-pregnene-20-one, M.P. 205–207° C. (from ethyl acetate).

77.3 g. of 3β-acetoxy-16-methylene-17α-hydroxy-5-pregnene-20-one are suspended in 400 ml. dioxane and mixed with 50 ml. 0.28-molar perchloric acid and then, with stirring at 5–15° C., with 69 g. of N-bromoacetamide. Then, the mixture is stirred at 10–15° C. for 3 hours; 10% aqueous sodium sulfite solution is stirred into the reaction mixture, and the latter is allowed to stand overnight at 0° C. After the precipitate has been vacuum-filtered, the moist product is dissolved in chloroform, washed neutral with water, the solution concentrated by evaporation, and the residue recrystallized from ether. There are obtained 73 g. 3β-acetoxy-5α-bromo-6β-hydroxy - 16β - bromomethyl - 16α,17α - oxido-pregnane-20-one, M.P. 161° C. (decomposition).

180 g. of the bromo-compound are dissolved at room temperature in 800 ml. dry pyridine. Thereafter, at 0–5° C., under stirring and a nitrogen atmosphere, about 21 g. nitrosyl chloride are introduced until a permanent blue color of the reaction solution is obtained. Then, this solution is stirred into ice water, vacuum-filtered, and washed with ice water. The residue is washed with methanol and dried. Yield: 180 g. 3β-acetoxy-5α-bromo-6β-nitrito-16β-bromomethyl - 16α,17α - oxido-pregnane - 20-one, M.P. 146–152° C. (decomposition).

15 g. 6β-nitrito compound are dissolved in 250 ml. toluene and irradiated for 1½ hours under a nitrogen atmosphere at −20° C. with a mercury high pressure lamp. The precipitate produced by allowing the reaction mixture to stand overnight at 0° C. is vacuum-filtered, washed with toluene and petroleum ether, and dried. There is obtained from 45 to 55% of 3β-acetoxy-5α-bromo-6β-hydroxy-16β-bromomethyl - 16α,17α - oxido-19-oximino-pregnane-20-one, M.P. 192° C. (decomposition).

5.91 g. of the thus-produced oxime are dissolved at 40° C. in 1 liter of glacial acetic acid and mixed, after the addition of 200 ml. of water, batchwise with 5.91 g. sodium nitrite. Thereupon, the reaction mixture is stirred for 8 minutes at 40° C., stirred into ice water, and extracted with methylene chloride.

From the extracts, there are obtained 5.6 g. of 3β-acetoxy-5α-bromo - 6β-hydroxy - 16β - bromomethyl-16α,17α-oxido-19-oxo-pregnane-20-one-6,19-hemiacetal, M.P. 167–170° C.

The crude hemiacetal is dissolved in 350 ml. of acetone and mixed with 3 g. of chromium trioxide at room temperature and under a nitrogen atmosphere. After stirring for 4 minutes, 300 ml. 50% methanol are added; the mixture is stirred into ice water and extracted with ether. From the ether solution, there are obtained 3.74 g. 3β-acetoxy-5α-bromo - 6 - hydroxy - 16β - bromomethyl-16α,17α-oxido-pregnane-20-one-19-oic acid-6,19-lactone, M.P. 210–212° C.

5.74 g. of lactone are dissolved at room temperature in 500 ml. glacial acetic acid, mixed with 100 g. of zinc dust, and boiled for 5 minutes. Then, the reaction mixture is filtered in 3 l. of ice water, washed with hot glacial acetic acid, and the filtrate extracted with chloroform. The combined chloroform extracts yield, after washing until a neutral reaction is obtained, drying, concentration, and recrystallization from acetone, 3.35 g. of 3β-acetoxy-16-methylene-17α-hydroxy-5-pregnene-20-one-19-oic acid, M.P. 239–240° C. (ether/n-hexane).

4.16 g. of the acid are dissolved in 200 ml. of methanol, and, while boiling under a nitrogen atmosphere, are mixed dropwise, within 15 minutes, with 4 g. potassium hydroxide in 8 ml. water and 80 ml. of methanol, the water and methanol being combined to a solution. The reaction mixture is then boiled for another 70 minutes, acidified after cooling with 50% acetic acid, concentrated by evaporation, and the residue is taken up in water, vacuum-filtered, and dried. Yield: 2.45 g. of 3β,17α-dihydroxy-16-methylene-5-pregnene-20-one-19-oic acid, M.P. 262–264° C.

EXAMPLE 2

(a) 236 mg. of 3β,17α-diacetoxy-16-methylene-5-pregnene-20-one-19-oic acid-methyl ester are dissolved in 12 ml. of methanol and mixed dropwise, under ice cooling, with 0.5 ml. acetyl chloride. After allowing the reaction mixture to stand at room temperature for 20 hours, it is concentrated, the residue poured into water, the precipitate is filtered off, and dried. There is obtained 3β-hydroxy-16-methylene - 17α - acetoxy-5-pregnene - 20-one-19-oic acid-methyl ester having the melting point of 112–114° C.

(b) 100 mg. of the 3β-hydroxy compound are dissolved in 30 ml. absolute acetone, mixed dropwise with 0.1 ml. chromic acid solution at 0° C. under a nitrogen atmosphere, concentrated after 10 minutes, poured into ice water, and the precipitate is vacuum-filtered and dried. There are obtained 100 mg. of oily 16-methylene-17α-acetoxy-5-pregnene-3,20-dione-19-oic acid-methyl ester.

(c) 100 mg. of the 3β-hydroxy compound are dissolved in 2 ml. dry cyclohexanone and 0.8 ml. toluene, mixed with 100 mg. aluminum tert.-butylate, and boiled for 45 minutes under a nitrogen atmosphere. Then, the reaction mixture is mixed with 2 N caustic soda solution and extracted with ether. The ether extracts are washed with water, dried, and concentrated by evaporation. An oily 3,20-dione is obtained as in (b).

(d) A 3,20-dione obtained in accordance with (b) or (c) is dissolved in 8 ml. methanol, mixed with 2.7 ml. of glacial acetic acid and 150 mg. Girard reagent T, and boiled for 1½ hours. The reaction mixture is cooled and stirred into ice water containing sodium carbonate. The non-ketonic fraction is extracted with ether. The aqueous phase is acidified with hydrochloric acid and allowed to stand for 2 hours at room temperature. Thereafter, the acidic mixture is extracted with ether, the extract washed neutral with water, and dried. After removing the ether by evaporation, there remains a residue of 75 mg. of a crude product consisting of 16-methylene-17α-acetoxy-19-nor-progesterone and a small quantity of the corresponding 5-pregnene. By subsequent treatment with dilute methanolic hydrochloric acid at room temperature, the pure 16-methylene-17α-acetoxy-19-norprogesterone is obtained, M.P. 178–180° C. (from methanol).

(e) 0.2 g. of 16-methylene-17α-acetoxy-19-nor-progesterone is dissolved in 10 ml. methanol. A solution of 0.2 g. potassium hydroxide in 5 ml. water is added. The mixture is refluxed for one hour in a nitrogen atmosphere, cooled, acidified with 15% acetic acid, and extracted with chloroform. The chloroform is distilled off, the residue is recrystallized from chloroform/acetone (1:1), and the thus-obtained 16-methylene-17α-hydroxy-19-nor-progesterone is converted into the 17α-ethoxy compound, as in Example 1.

Preparation of the starting compound 1 g. 3β-acetoxy-16-methylene-17α-hydroxy-5-pregnene-20-one-19-ioc acid is dissolved in 10 ml. absolute ether and mixed with ethereal diazomethane solution. Thereafter, the reaction mixture is allowed to stand at room temperature for 1 hour, whereupon it is filtered and concentrated by evaporation. There is obtained 0.95 g. 3β-acetoxy-16-methylene-17α-hydroxy-5-pregnene-20-one-19 - oic acid-methyl ester, M.P. 194–195° C. (ether).

430 mg. of the preceding methyl ester are allowed to stand for 20 hours at room temperature with 10 ml. acetic anhydride, 18 ml. glacial acetic acid, and 0.3 g. p-toluenesulfonic acid monohydrate. The precipitate produced upon pouring into ice water is filtered off, washed, and dried. After recrystallization from isopropanol/water (1:2), there are obtained 400 mg. 3β,17α-diacetoxy-16-methylene-5-pregnene-19-oic acid-methyl ester, M.P. 155–157° C. (ether).

EXAMPLE 3

350 mg. of 3,19,20-trioxo-16-methylene-4-pregnene-17α-ol are boiled overnight with 5 ml. 3 N ethanolic hydrochloric acid. The reaction mixture is then concentrated by evaporation, the residue is dissolved in chloroform, washed with sodium bicarbonate solution and with water, dried, and the solution is chromatographed on silica gel. By concentrating the eluate and adding acetone, there is obtained 16-methylene-17α-hydroxy-19-nor-progesterone, M.P. 234–236° C., which is converted into 16-methylene-17α-ethoxy-19-nor-progesterone, as in Example 1.

EXAMPLE 4

2.5 ml. ethylene glycol and 20 mg. p-toluenesulfonic acid are added to a solution of 400 mg. of 10-cyano-16-methylene-17α-acetoxy-19-nor-progesterone (obtained by partial oximation of 3,19,20-trioxo-16-methylene-4-pregnene-17α-ol and subsequent dehydration with acetic anhydride in the presence of p-toluenesulfonic acid with simultaneous acetylation of the 17-hydroxy group) in 5 ml. benzene. The reaction solution is boiled overnight on a water trap; then, a few drops of pyridine are added, and the mixture is evaporated to dryness. The thus-obtained crude ketal is dissolved in a mixture of 6 ml. tetrahydrofurane and 6 ml. absolute methanol, and the thus-produced solution is added dropwise to 60 ml. of liquid ammonia. Under stirring, 0.75 g., lithium is added in small pieces and gradually, until the blue color is permanent. Thereafter, stirring is continued until the blue coloring has vanished. After the addition of 10 ml. ethanol, the solution is concentrated on a water bath, taken up in ether, and boiled until the ammonia is completely eliminated. Thereafter, the reaction mixture is diluted with water, and the organic layer is separated, the latter being washed with water, dried, and concentrated by evaporation. The thus-obtained crude product is converted, by standing for several hours with ethanolic hydrochloric acid, into the free 16-methylene-17α-hydroxy-19-nor-progesterone; after the usual working-up process and recrystalization from acetone, this product melts at 234–236° C. This compound is transformed into 16-methylene-17α-methoxy-19 - nor-progesterone by the etherification method described in Example 1, but replacing the ethyl iodide by methyl iodide.

The following examples include pharmaceutical compositions of the novel compounds:

EXAMPLE 5

Tablets

Each tablet contains: Mg.
16-methylene-17α-ethoxy-19-nor-progesterone ___ 2
Lactose _____ 70
Potato starch _____ 26
Magnesium stearate _____ 2

EXAMPLE 6

Coated tablets

Each tablet contains: Mg.
16-methylene-17α-ethoxy-19-nor-progesterone ___ 3
Lactose _____ 80
Corn starch _____ 15
Talc _____ 2

The coating is a mixture of corn starch, sugar, talc, and tragacanth.

EXAMPLE 7

Tablets

Each tablet contains: Mg.
16-methylene-17α-ethoxy-19-nor-progesterone ___ 2
17α-ethynyl estradiol _____ 0.06
Lactose _____ 85
Potato starch _____ 10
Talc _____ 2
Magnesium stearate _____ 1

EXAMPLE 8

Tablets

Each tablet contains: Mg.
- 16-methylene-17α-ethoxy-19-nor-progesterone --- 3
- 17α-ethynyl-estradiol-3-methyl ether ---------- 0.1
- Lactose -------------------------------------- 80
- Corn starch ---------------------------------- 42
- Arrowroot ------------------------------------ 15
- Talc ------------------------------------------ 8
- Colloidal silicic acid ------------------------- 0.2
- Magnesium stearate -------------------------- 2

EXAMPLES 9–12

Examples 9–12 are the same as Examples 5–8, except for the replacement of 16-methylene-17α-ethoxy-19-nor-progesterone by the corresponding 17α-methoxy compound.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula:

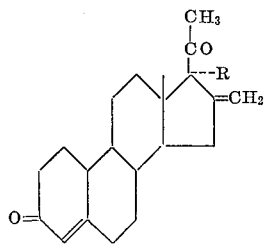

wherein R represents an etherified hydroxy group.

2. A compound as defined by claim 1 wherein R is alkoxy of 1–4 carbon atoms.

3. A compound as defined by claim 1 wherein R is methoxy.

4. A compound as defined by claim 1 wherein R is ethoxy.

5. A pharmaceutical composition in dosage unit form comprising a compound as defined by claim 1 and a pharmaceutical carrier.

6. A composition as defined by claim 5 wherein said dosage unit is a tablet and said pharmaceutical carrier is talc or a carbohydrate.

7. A pharmaceutical composition in dosage unit form, containing about 0.3 to 200 mg. of a compound as defined by claim 1, and a pharmaceutical carrier.

8. A pharmaceutical composition as defined by claim 7, further comprising 17α-ethynyl-estradiol, the 3-methyl ether, the 3-cyclopentyl ether, or the 3-acetate thereof.

9. A process for effecting an ovulation-inhibiting activity with weak or no anti-androgenic side effects, which process comprises administering to a mammal an effective dosage of a compound as defined by claim 1.

10. A process as defined by claim 9 wherein R is alkoxy of 1–4 carbon atoms.

References Cited

UNITED STATES PATENTS

| | | | |
|---|---|---|---|
| 3,105,840 | 10/1963 | Beyler | 260—397.4 |
| 3,253,003 | 5/1966 | Wettstein et al. | 260—397.4 |
| 3,449,495 | 6/1969 | Bruckner et al. | 424—243 |

LEWIS GOTTS, Primary Examiner

E. G. LOVE, Assistant Examiner

U.S. Cl. X.R.

195—51; 204—158; 260—239.55, 239.57, 397.1, 397.4; 424—243